US007842402B2

(12) United States Patent
Feng et al.

(10) Patent No.: US 7,842,402 B2
(45) Date of Patent: Nov. 30, 2010

(54) MACHINE COMPONENTS AND METHODS OF FABRICATING

(75) Inventors: Ganjiang Feng, Greenville, SC (US); Paul S. Dimascio, Greer, SC (US); Jon C. Schaeffer, Greenville, SC (US)

(73) Assignee: General Electric Company, Schenectady, NY (US)

(*) Notice: Subject to any disclaimer, the term of this patent is extended or adjusted under 35 U.S.C. 154(b) by 1038 days.

(21) Appl. No.: 11/395,633

(22) Filed: Mar. 31, 2006

(65) Prior Publication Data

US 2010/0119871 A1 May 13, 2010

(51) Int. Cl.
*B32B 15/04* (2006.01)

(52) U.S. Cl. ....................... 428/632; 428/680; 427/404; 427/456; 416/241 R

(58) Field of Classification Search ....................... None
See application file for complete search history.

(56) References Cited

U.S. PATENT DOCUMENTS

| | | | | |
|---|---|---|---|---|
| 4,034,142 | A | 7/1977 | Hecht | |
| 4,419,416 | A | 12/1983 | Gupta et al. | |
| 4,585,481 | A | 4/1986 | Gupta et al. | |
| 4,758,480 | A * | 7/1988 | Hecht et al. | 428/680 |
| 4,861,618 | A | 8/1989 | Vine et al. | |
| 5,846,605 | A | 12/1998 | Rickerby et al. | |
| 5,981,091 | A | 11/1999 | Rickerby et al. | |
| 6,136,453 | A | 10/2000 | Ritter et al. | |
| 6,255,001 | B1 | 7/2001 | Darolia | |
| 6,306,515 | B1 | 10/2001 | Goedjen et al. | |
| 6,368,727 | B1 | 4/2002 | Ritter et al. | |
| 6,455,167 | B1 | 9/2002 | Rigney et al. | |
| 6,861,157 | B2 | 3/2005 | Zhao et al. | |
| 2005/0112398 | A1 * | 5/2005 | Darolia et al. | 428/632 |

FOREIGN PATENT DOCUMENTS

| | | | |
|---|---|---|---|
| EP | 1319730 | A1 | 6/2003 |

* cited by examiner

*Primary Examiner*—Aaron Austin
(74) *Attorney, Agent, or Firm*—Armstrong Teasdale LLP

(57) ABSTRACT

A thermal barrier coating (TBC) system is provided. The system includes at least one thermal barrier coating (TBC) bond coat layer formed over a substrate surface region. The TBC bond coat layer includes at least one TBC bond coat material. The TBC bond coat material is a nickel-chromium-aluminum-yttrium (NiCrAlY) composition that also includes silicon (Si), hafnium (Hf) and less than 10 weight percent (wt %) cobalt (Co). The TBC system further includes at least one top coat layer formed over the TBC bond coat layer.

17 Claims, 2 Drawing Sheets

MACHINE COMPONENTS AND METHODS OF FABRICATING

BACKGROUND OF THE INVENTION

This invention relates generally to the fabrication of machine components and more particularly, to methods of forming a bond coat on a machine component as part of a thermal barrier coating system.

Known turbine blades are coupled to a central hub that is attached to a rotor shaft such that the blades extend generally radially outward from the rotor shaft with respect to a central axis of the hub and shaft. Each blade includes an airfoil. During operation, a high energy driving fluid, such as a combustion gas stream for example, impacts the airfoils to impart a rotational energy to the blades that in turn rotates the shaft.

Because of the high temperatures of known combustion gas streams, some known combustion turbine blades at least include a thermal barrier coating (TBC) system that is formed from a plurality of layers over a substrate surface of the airfoil. The layers may have a variety of material compositions to ensure the TBC systems provide a variety of protective functions. Some known turbine blades have a first layer formed over the airfoil substrate typically using a material often referred to as "bond coat". Bond coat is a term often used to refer to a variety of materials that form an adherent protective first layer over the substrate and facilitate bonding of a subsequent layer of compatible material to the surface of the layer of bond coat. One example of a TBC system protective function is that TBC systems facilitate shielding airfoils from high temperature combustion gases. More specifically, known TBC systems may reduce substrate temperatures by as much as 100° C. (180° F.), thereby reducing the potential for thermal fatigue and/or creep of the substrate. In addition, the reduced substrate temperature facilitates reducing the potential for thermally-induced oxidation and/or corrosion of the substrate.

During operation, as the airfoils and their TBC systems, are exposed to the hot, and potentially oxidative and/or corrosive environments that typically exist in combustion turbines, the airfoil TBC system may be altered. For example, continued exposure to such environments may adversely impact the thermally grown oxide (TGO) layer and may induce stresses within the laminations of the TGO layer that may cause a premature failure and/or spallation (i.e., sectional removal of a material, or delamination) of the bond coat and/or top coat materials. Spallation of the TBC system may undesirably expose the airfoil substrate to the high temperatures.

Moreover, continued exposure to such environments may also facilitate the diffusion of aluminum from the bond coating. The diffusional loss of aluminum (Al) to the substrate may reduce the concentration of aluminum in the bond coating, thereby reducing the ability of the bond coating to continue generating protective and adherent alumina scale at the TGO layer interface between the bond coat layer and the top coat layer. In addition, the interdiffusion of aluminum may cause a diffusion zone to be formed within the airfoil wall that may adversely affect the substrate properties. For example, the addition of aluminum to the substrate's elemental composition may decrease the substrate fatigue strength of the airfoil wall and/or shorten the life of the airfoil.

BRIEF DESCRIPTION OF THE INVENTION

In one aspect, a method of fabricating a machine component is provided. The method includes providing a machine component having a substrate including a surface region. The method further includes forming a thermal barrier coating (TBC) system over the component such that at least one TBC bond coat layer is formed over the substrate surface region. The at least one TBC bond coat layer is formed by a high velocity oxyfuel flame (HVOF) spray application. The TBC bond coat material is a nickel-chromium-aluminum-yttrium (NiCrAlY) composition having silicon (Si), hafnium (Hf) and less than 10 weight percent (wt %) cobalt (Co).

In another aspect, a thermal barrier coating (TBC) system is provided. The system includes at least one thermal barrier coating (TBC) bond coat layer formed over a substrate surface region. The TBC bond coat layer includes at least one TBC bond coat material. The TBC bond coat material is a nickel-chromium-aluminum-yttrium (NiCrAlY) composition that also includes silicon (Si), hafnium (Hf) and less than 10 weight percent (wt %) cobalt (Co). The TBC system further includes at least one top coat layer formed over the TBC bond coat layer.

In a further aspect, a machine component is provided. The machine component includes a substrate that has a surface region. At least a portion of the substrate surface region has a predetermined material composition. The machine component also includes a thermal barrier coating (TBC) system. The TBC system includes at least one TBC bond coat layer and at least one top coat layer formed over the TBC bond coat layer. The TBC bond coat layer includes at least one TBC bond coat material. The material is a nickel-chromium-aluminum-yttrium (NiCrAlY) composition including silicon (Si), hafnium (Hf) and less than 10 weight percent (wt %) cobalt (Co).

DETAILED DESCRIPTION OF THE INVENTION

As used herein, the term "layer" refers to, but is not limited to, a sheet-like expanse, or region of a material or materials, covering a surface, or forming an overlying or underlying part or segment of an article such as a turbine component. A layer has a thickness dimension. The term layer does not refer to any particular process by which the layer is formed. For example, a layer can be formed by spraying, coating, or a laminating process.

Figure 1:
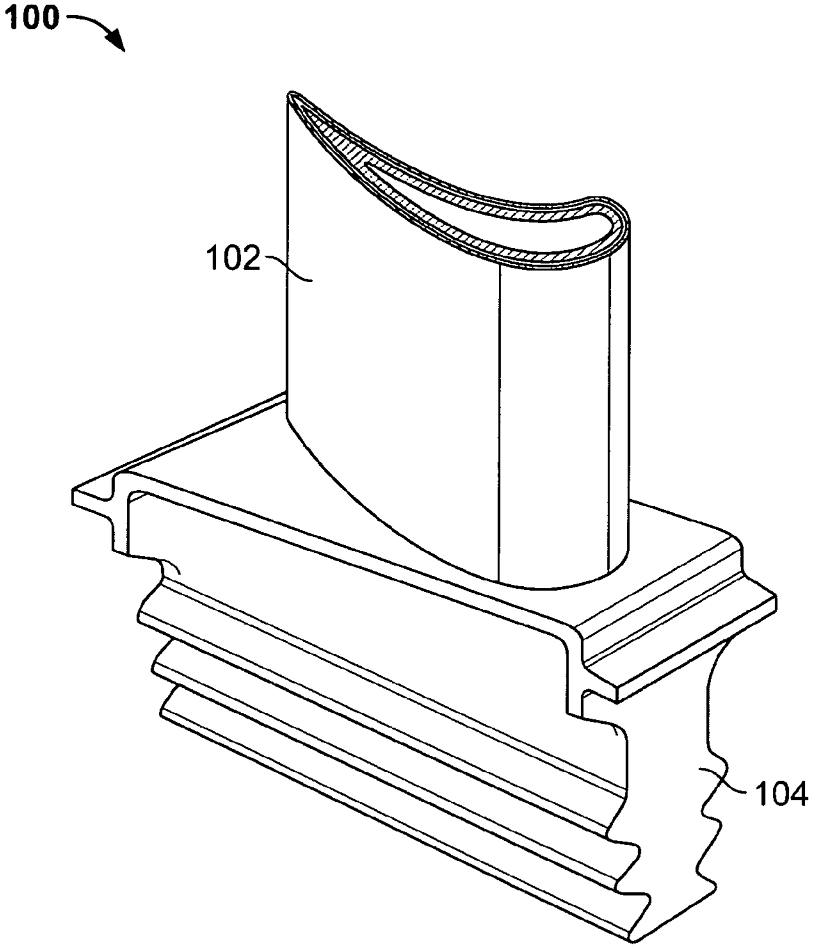
FIG. 1 is a perspective view of an exemplary combustion turbine blade.

FIG. 1 is a perspective view of an exemplary combustion turbine blade 100. Blade 100 includes an airfoil 102 that extends from a dovetailed blade root 104. Root 104 is inserted into a similarly shaped region on a hub (not shown in FIG. 1) centrally positioned within a turbine (not shown in FIG. 1). A plurality of turbine blades 100 are coupled to the central hub that is attached to a combustion turbine rotor shaft (not shown in FIG. 1) such that blades 100 extend generally radially outward from the rotor shaft with respect to a central axis of the hub and shaft. During operation, a high energy driving fluid, such as a combustion gas stream for example, impacts airfoils 102 to impart a rotational energy to blades 100 that in turn rotates the shaft.

Figure 2:
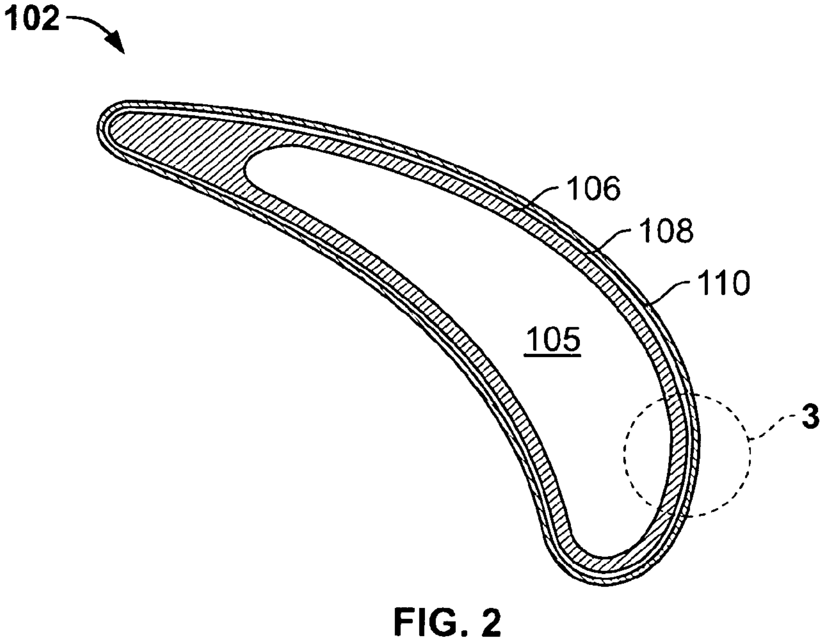
FIG. 2 is a cross-sectional schematic illustration of an exemplary airfoil that may be used with the blade in FIG. 1.

FIG. 2 is a cross-sectional schematic illustration of exemplary airfoil 102 that may be used with blade 100 (shown in FIG. 1). Airfoil 102 has an internal cooling fluid passage 105 that channels a cooling fluid, typically air, within airfoil 102 to facilitate removing heat from the inner surfaces defining fluid passage 105. Airfoil 102 also has a substrate 106 that may be formed of a superalloy material. The superalloy is typically a nickel-based or a cobalt-based alloy, wherein the amount of nickel or cobalt in the superalloy is the single greatest element by weight. Illustrative nickel-based superalloys include at least, but are not limited to including, approximately 40 weight percent nickel (Ni), and at least one component from the group consisting of cobalt (Co), chromium (Cr), aluminum (Al), tungsten (W), molybdenum (Mo), titanium (Ti), tantalum (Ta), Niobium (Nb), hafnium (Hf), boron (B), carbon (C), and iron (Fe). Examples of nickel-based superalloys may be designated by, but are not limited to, the trade names Inconel®, Nimonic®, Rene® (e.g., Rene®80-, Rene®95, Rene®142, and Rene®N5 alloys), and Udimet®, and include directionally solidified and single crystal superalloys. Illustrative cobalt-base superalloys include at least about 30 weight percent cobalt, and at least one component from the group consisting of nickel, chromium, aluminum, tungsten, molybdenum, titanium, and iron. Examples of cobalt-based superalloys are designated by, but are not limited to, the trade names Haynes®, Nozzaloy®, Stellite® and Ultimet®.

Airfoil 102 is also fabricated with an additional substrate surface 108 that is formed over substrate 106 and may be shaped with predetermined dimensions to a set of predetermined contours and thicknesses substantially similar to the dimensions of finished airfoil 102. Airfoil 102 also includes a thermal barrier coating (TBC) system 110. Because of the high temperatures of known combustion gas streams, some known combustion turbine blades 100 have a thermal barrier coating (TBC) system 110 that is formed from a plurality of layers (not shown in FIG. 2) over substrate surface 108 of airfoil 102. In one embodiment, the range of combustion gas stream temperatures is approximately 1316° Celsius (C.) to 1427° C. (2400° Fahrenheit (F.) to 2600° F.). The layers may have a variety of material compositions to facilitate TBC system 110 in facilitating shielding airfoils 102 from high temperature combustion gases. TBC systems may reduce substrate temperatures by as much as 100° C. (180° F.), thereby reducing the potential for thermal fatigue and/or creep of the substrate. In addition, the reduced substrate temperature facilitates reducing the potential for thermally-induced oxidation and/or corrosion of the substrate. System 110 is discussed further below.

Figure 3:
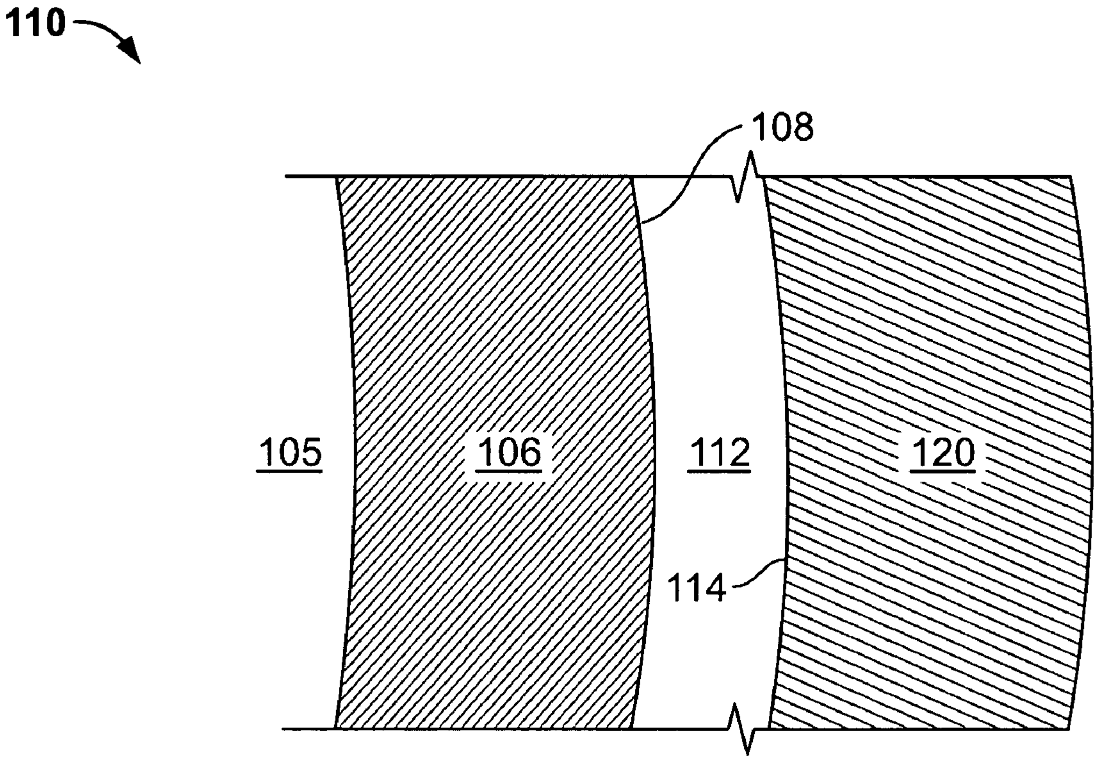
FIG. 3 is an enlarged view of a portion of the airfoil shown in FIG. 2 taken along area 3.

FIG. 3 is an enlarged view of a portion of airfoil 102 and taken along area 3 shown in FIG. 2. Cooling fluid passage 105 facilitates internal heat removal from substrate 106. Bond coat layer 112 is formed on substrate surface 108 as discussed further below. Top coat layer 120 is formed over bond coat layer surface 114. The layer constituents are discussed in more detail below.

TBC system bond coat layer 112 may be formed with at least one MCrAlX material. The MCrAlX designation for bond coating layer 112 describes a variety of metallic alloy chemical compositions that may be used in TBC system 110. Cr and Al are the standard abbreviations for chromium and aluminum. M normally refers to the elements nickel (Ni), Cobalt (Co), and iron (Fe), or combinations thereof. X may refer to elements such as tantalum (Ta), rhenium (Re), ruthenium (Rh), platinum (Pt), silicon (Si), boron (B), carbon (C), hafnium (Hf), yttrium (Y), and zirconium (Zr) and combinations thereof. The aforementioned MCrAlX materials facilitate forming an oxidation-resistant bond coating that mitigates oxidation of the interface between TBC system 110 and substrate 106, a significant TBC failure mechanism.

In the exemplary embodiment, NiCrAlY is used for bond coat layer 112. The material used in this invention has the following approximate weight by percent (wt %) of the major alloying elements that are used in bond coat layer 112:

| | |
|---|---|
| Ni | Balance |
| Cr | 21.90 |
| AL | 10.10 |
| Y | 1.04 |
| Si | 2.50 |
| Hf | 0.50 |
| Co | 0.00 |

In addition to these major alloying elements, small proportions of minor elements may be added to enhance oxidation resistance performance. These minor elements may include elements from the platinum group of metals (PGM), usually ruthenium (Rh) and platinum (Pt).

Alternatively, the NiCrAlY may have the following major alloying elements by their approximate weight by percent:

| | |
|---|---|
| Ni | Balance |
| Cr | 5.00-30.00 |
| AL | 5.00-20.00 |
| Y | 0.01-5.00 |
| Si | 0.50-4.00 |
| Hf | 0.20-2.00 |
| Co | 0.00-5.00 |

The 4.00% value associated with Si is based on a tendency to lose Si through the formation of a glassy silica in the form of silicon oxide ($SiO_x$) at Si values greater than 4% which in turn tends to decrease the stability of the coating and facilitates a reduction in oxidation resistance and an increase in spallation potential.

In general, the improvements seen as a result of this invention are most prominent when cobalt introduction into the bond coat material is mitigated. Less deleterious effects are seen at weight percent values of less than 5% for Co. Co wt % values above 5% mitigate any potential benefits that may be obtained from the addition of Si and Hf to the bond coat material. Co may increase a thermal expansion mismatch between bond coat layer 112 and top coat layer 120 which may subsequently decrease adhesion of layer 120 to layer 112.

In the exemplary embodiment, the aforementioned elements are combined and mixed into a pre-alloyed powder and then sprayed onto substrate surface 108 using a high velocity oxyfuel flame (HVOF) spraying process. In this process, the bond coat material powder is sprayed onto substrate surface 108. Airfoil 102 is positioned within a fixture (not shown in FIG. 3) that rotates airfoil 102 with respect to a HVOF gun (not shown in FIG. 3). A robot (not shown in FIG. 3) holding the HVOF gun is positioned at a predetermined distance from the fixture. A fuel such as oxypropylene or kerosene is combusted to heat the powder into a molten state. The resultant combustion gas will have a temperature in the range of 1649° Celsius (C.) (3000° Fahrenheit (F.)) to 2760° C. (5000° F.) and this gas is used as a propellant that may impart a velocity of 610 meters per second (m/s) (2000 feet per second (ft/s)) to 1524 m/s (5000 ft/s). Layer 112 of bond coat material is deposited in a given plane or unit of area during one pass of the HVOF gun. In order to substantially completely cover surface 108 of substrate 106 and obtain the necessary thickness of bond coating layer 112, it is generally desirable that the HVOF gun and substrate surface 108 be moved in relation to one another when depositing bond coating layer 112. This can take the form of moving the gun, substrate surface 108, or both, and is analogous to processes used for spray painting. Alternatively, methods of forming layer 112 may include, but not be limited to plasma spraying.

Also, alternatively, a co-spraying process in which the elements are simultaneously sprayed onto the substrate in the proper concentrations and proportions may be used as long as the process delivers a uniform and continuous coating of the desired composition. This is especially true for the Si additive since, as discussed above, any non-uniformly distributed Si that may cause localized weight percents of Si to exceed 4% may facilitate a reduction in oxidation resistance and an increase in spallation potential. Furthermore, as Si is more evenly distributed throughout layer 112, bulk diffusion of Al from layer 112 into substrate 106 is mitigated.

Airfoil 102 with bond coat layer 112 is placed into a furnace and heat treated. Airfoil 102 is maintained at a temperature of 982° Celsius (C.) (1800° Fahrenheit (F.)) to 1148° C. (2100° F.) for a period of time between two and four hours in a substantial vacuum. Airfoil 102 is subsequently removed from the oven and allowed to cool to a predetermined temperature at a predetermined cooling rate.

Upon completion of cooling, top coat layer 120 is formed on surface 114 in a manner similar to that used for bond coat layer 112 except that a plasma spray process is used instead of an HVOF process Top coat layer 120 is typically a ceramic material such as zirconium oxide ($ZrO_2$) mixed with 6 to 8 mole percent (mol %) yttrium oxide ($Y_2O_3$), sometimes referred to as yttria-stabilized zirconia, or YSZ, with the chemical formula $(Y_2O_3)_6$ $(ZrO_2)_{94}$ to $(Y_2O_3)_8$ $(ZrO_2)_{92}$. In the exemplary embodiment, layer 120 is approximately 0.0508 centimeters (cm) (0.02 in) thick. Alternatively, layer 120 thickness may be varied to meet or exceed predetermined operational parameters upon installation in a combustion turbine.

Airfoil 102 with top coat layer 120 is placed into a furnace and heat treated. Airfoil 102 is maintained at a temperature of 982° Celsius (C.) (1800° Fahrenheit (F.)) to 1148° C. (2100° F.) for a period of time between two and four hours in a substantial vacuum. Airfoil 102 is subsequently removed from the oven and allowed to cool to a predetermined temperature at a predetermined cooling rate.

Operational service exposure of airfoils 102 with TBC system 110 to hot, oxidative and corrosive environments that typically exist in combustion turbines causes a number of metallurgical processes to alter TBC system 110. For example, the Al-rich, normally oxidation-resistant bond coating layer 112 initially forms a highly adherent thermally grown oxide (TGO) layer (not shown in FIG. 3) that grows at the interface of bond coat layer 112 and top coat layer 120. The aluminum oxide layer is sometimes referred to as an alumina ($Al_2O_3$) scale layer. The TGO layer is formed as a function of temperature, i.e., the higher the temperature, the greater the rate of aluminum oxide formation in the TGO layer. As the oxide layer experiences nominal delamination throughout the engine's operational cycles, at least some of the remaining Al in bond coat layer 112 replaces TGO layer laminations that are removed, i.e., substantially consistent formation and regeneration of the TGO layer may occur. It is generally desired to maintain a controlled stable growth of the TGO layer. Unstable growth of the TGO layer induces stresses within the laminations at the TGO layer-to-bond coat interface 108 that may initiate an exceeding of the laminations' stress parameters and a subsequent spallation (i.e., sectional removal of a material, or delamination) of the bond coat and top coat materials. Spallation of TBC system 110 may directly expose airfoil substrate 106 to the high temperature fluid.

A further thermally-driven mechanism tends to facilitate the diffusion of aluminum from bond coating layer 112 into substrate 106. This diffusional loss of Al to substrate 106 may initiate a variety of deleterious conditions. For example, the migration of Al into substrate 106 reduces the concentration of Al in bond coating layer 112, thereby reducing the ability of bond coating layer 112 to continue generation of the protective and adherent alumina scale at the TGO layer interface 114 between bond coat layer 112 and top coat layer 120. Also, the interdiffusion of Al forms a diffusion zone within airfoil substrate 106. This interdiffusion zone may compromise substrate 106 properties. For example, the addition of Al to substrate 106 elemental composition may induce precipitation of brittle phases within the affected sections of substrate 106. The brittle phases tend to decrease substrate 106 fatigue strength which may result in the undesirable consumption of airfoil 102 wall. A further potential result of Al diffusion out of bond coat layer 112 is to cause a phase change in bond coat layer 112. A discussion on crystalline material phases follows below.

Bond coat layer 112 and top coat layer 120 typically have crystalline lattice-type molecular structures. Crystalline materials (i.e., most solids) have a molecular structure that resembles a lattice. Materials also exist in phases and the phase of a material defines its performance under certain conditions. A material with two separate crystalline structures may be considered to have two phases. A phase is a homogeneous portion of a system that has uniform physical and chemical characteristics. Given certain circumstances, for example high temperatures, certain materials may exhibit transitional behavior, i.e., the material will change phase, for example, from the beta phase to the gamma phase via processes that are well understood by practitioners of the art. A phase change as manifested by a change of the crystalline structure within bond coat layer 112 will induce a strain within the interlaminar regions at the boundary between the regions that have undergone a phase transformation and those regions that have not. Also, the phase change can generate a strain mismatch between top coat layer 120 and bond coat layer 112 at the interface of the two layers' laminations. This strain mismatch may induce spallation in a manner similar to that described above.

The addition of silicon and hafnium to the bond coat mixture increases oxidation resistance of bond coat layer 112 which subsequently increases the useful in-service life expectancy of airfoil 102. The mitigation of silicon oxides (SiOx) and a substantially uniform distribution of Si throughout bond coat layer 112 tend to facilitate improvement of oxidation resistance. Si, in the solid solution, tends to mitigate a rate of diffusion of oxygen and sulfur ions within layer 112. Moreover, Hf tends to stabilize the oxide layer formed during operation and mitigate spalling.

As is well know in the art, inclusion of Si in the basic NiCrAlY coating mixture in the amount predetermined to improve oxidation resistance has a tendency to decrease the ductility of the coating, i.e., the ability to deform prior to fracturing. Good ductility in the coating tends to allow expansion and contraction throughout the operational temperature range of the combustion turbine engine while mitigating the creation of flaws in the material's crystalline structure as well as disassociation from the substrate. Adding Hf to bond coat layer 112 material tends to reduce the amount of Si used to obtain the desired oxidation resistance which in turn mitigates the decrease in ductility.

In addition to the facilitation of improved oxidation resistance, Hf preferably resides in the beta phase which tends to mitigate beta phase to gamma phase transformation within the bond coat layer 112 crystalline structure. Therefore, the Hf in exemplary bond coat layer 112 acts as a phase stabilizer and mitigates deleterious crystalline phase changes.

The methods and apparatus for a fabricating a turbine blade described herein facilitates operation of a turbine system. More specifically, forming a bond coat layer on the turbine blade as described above facilitates a more robust, wear-resistant and reliable turbine blade. Such blade also facilitates reduced maintenance costs and turbine system outages.

Exemplary embodiments of turbine blades as associated with turbine systems are described above in detail. The methods, apparatus and systems are not limited to the specific embodiments described herein nor to the specific illustrated turbine blades.

While the invention has been described in terms of various specific embodiments, those skilled in the art will recognize that the invention can be practiced with modification within the spirit and scope of the claims.

What is claimed is:

1. A method of fabricating a machine component comprising:

providing a machine component having a substrate including a surface region;

forming a thermal barrier coating (TBC) system over the component comprising forming at least one TBC bond coat layer over the substrate surface region, wherein the at least one TBC bond coat layer is a nickel-chromium-aluminum-yttrium (NiCrAlY) composition having silicon (Si), hafnium (Hf) and less than 10 weight percent (wt %) cobalt (Co), wherein the at least one TBC bond coat layer comprises at least one oxygen active element selected from the group consisting of iridium, osmium, palladium, platinum, rhodium, and ruthenium; and distributing Si substantially uniformly within the at least one TBC bond coat layer such that:

localized weight percents of Si do not exceed a predetermined weight percent of approximately 4.0%; and formation of $SiO_2$ is facilitated to be reduced.

2. A method of fabricating a machine component in accordance with claim 1 wherein forming at least one TBC bond coat layer comprises spraying a TBC bond coat material having a composition of approximately 5.0-30.00 wt % Cr, approximately 5.00-20.00 wt % Al, approximately 0.01-5.00 wt % Y, approximately 0.5-4.00 wt % Si, approximately 0.20-2.00 wt % Hf, approximately 0.00-5.00 wt % Co and the balance substantially Ni.

3. A method of fabricating a machine component in accordance with claim 2 wherein spraying a TBC bond coat material comprises spraying a material having a composition of approximately 21.90 wt % Cr, approximately 10.10 wt % Al, approximately 1.04 wt % Y, approximately 2.5 wt % Si, and approximately 0.20-2.00 wt % Hf, and the balance substantially Ni.

4. A method of fabricating a machine component in accordance with claim 2 wherein spraying a TBC bond coat material comprises HVOF spraying a TBC bond coat material.

5. A method of fabricating a machine component in accordance with claim 4 wherein HVOF spraying a TBC bond coat material comprises using a pre-alloyed powder.

6. A method of fabricating a machine component in accordance with claim 4 wherein HVOF spraying a TBC bond coat material comprises using a co-sprayed powder mixture.

7. A method of fabricating a machine component in accordance with claim 2 wherein spraying a TBC bond coat material comprises plasma spraying a TBC bond coat material.

8. A thermal barrier coating (TBC) system comprising:

at least one thermal barrier coating (TBC) bond coat layer formed on a substrate surface region, said layer comprising at least one TBC bond coat material, said material being a nickel-chromium-aluminum-yttrium (NiCrAlY) composition, said NiCrAlY composition comprising silicon (Si), hafnium (Hf) and less than 10 weight percent (wt %) cobalt (Co), wherein the at least one TBC bond coat layer comprises at least one oxygen active element selected from the group consisting of iridium, osmium, palladium, platinum, rhodium, and ruthenium;

at least one top coat layer formed over said TBC bond coat layer; and a predetermined weight percent of Si substantially uniformly distributed within said at least one TBC bond coat layer such that localized weight percents of Si do not exceed a predetermined weight percent of approximately 4.0% and formation of $SiO_2$ is facilitated to be reduced.

9. A TBC system in accordance with claim 8 wherein said TBC bond coat layer comprises approximately 5.0-30.00 wt % Cr, approximately 5.00-20.00 wt % Al, approximately 0.01-5.00 wt % Y, approximately 0.5-4.00 wt % Si, approximately 0.20-2.00 wt % Hf, approximately 0.00-5.00 wt % Co and balance substantially Ni.

10. A TBC system in accordance with claim 8 wherein said TBC bond coat layer comprises approximately 21.90 wt % Cr, approximately 10.10 wt % Al, approximately 1.04 wt % Y, approximately 2.5 wt % Si, and approximately 0.20-2.00 wt % Hf, and balance substantially Ni.

11. A TBC system in accordance with claim 8 wherein said substrate surface comprises a superalloy, said superalloy is a nickel-based superalloy.

12. A TBC system in accordance with claim 8 wherein said NiCrAlY composition comprises a predetermined weight percent of Hf such that attaining said localized weight percents of Si that do not exceed a predetermined weight percent of approximately 4.0% is facilitated.

13. A machine component comprising:

a substrate, said substrate comprising a surface region, at least a portion of said substrate surface region comprising a predetermined material composition;

a thermal barrier coating (TBC) system comprising at least one thermal barrier coating (TBC) bond coat layer formed over said substrate surface region and at least one top coat layer formed over said TBC layer, said TBC bond coat layer comprising at least one TBC bond coat material, said material being a nickel-chromium-aluminum-yttrium (NiCrAlY) composition, said composition comprising silicon (Si), hafnium (Hf) and less than 10 weight percent (wt %) cobalt (Co), wherein the at least one TBC bond coat layer comprises at least one oxygen active element selected from the group consisting of iridium, osmium, palladium, platinum, rhodium, and ruthenium; and a predetermined weight percent of Si substantially uniformly distributed within said at least one TBC bond coat layer such that localized weight percents of Si do not exceed a predetermined weight percent of approximately 4.0% and formation of $SiO_2$ is facilitated to be reduced.

14. A machine component in accordance with claim 13 wherein said TBC bond coat layer comprises approximately 5.0-30.00 wt % Cr, approximately 5.00-20.00 wt % Al, approximately 0.01-5.00 wt % Y, approximately 0.5-4.00 wt % Si, approximately 0.20-2.00 wt % Hf, approximately 0.00-5.00 wt % Co and balance substantially Ni.

15. A machine component in accordance with claim 14 wherein said TBC bond coat layer comprises approximately 21.90 wt % Cr, approximately 10.10 wt % Al, approximately 1.04 wt % Y, approximately 2.5 wt % Si, and approximately 0.20-2.00 wt % Hf, and balance substantially Ni.

16. A machine component in accordance with claim 13 wherein said substrate surface predetermined material composition comprises a superalloy, said superalloy is a nickel-based superalloy.

17. A machine component in accordance with claim 13 wherein said NiCrAlY composition comprises a predetermined weight percent of Hf such that attaining said localized weight percents of Si that do not exceed a predetermined weight percent of 4.0% is facilitated.

* * * * *